(12) United States Patent
Medland

(10) Patent No.: US 6,308,486 B1
(45) Date of Patent: Oct. 30, 2001

(54) SURFACE CLADDING SYSTEM

(76) Inventor: Thomas Medland, 675 Woodside Street, Fergus, Ontario (CA), N1M 2M4

( * ) Notice: Subject to any disclaimer, the term of this patent is extended or adjusted under 35 U.S.C. 154(b) by 0 days.

(21) Appl. No.: 09/553,752

(22) Filed: Apr. 21, 2000

(30) Foreign Application Priority Data

| Apr. 22, 1999 | (CA) | 2269718 |
| Apr. 28, 1999 | (CA) | 2270277 |
| Jun. 9, 1999 | (CA) | 2273756 |

(51) Int. Cl.$^7$ .................................................. E04B 2/00
(52) U.S. Cl. .................. 52/506.05; 52/516; 52/478; 52/783.1
(58) Field of Search ................ 52/506.01, 506.03, 52/506.05, 512, 35, 287.1, 478, 409, 516, 717.04, 800.12, 411, 460, 783.1, 783.11, 506.09

(56) References Cited

U.S. PATENT DOCUMENTS

| 3,667,177 | * | 6/1972 | Biela | 52/278 |
| 3,740,908 | * | 6/1973 | Moore | 52/261 |
| 6,029,418 | * | 2/2000 | Wright | 52/745.1 |
| 6,108,991 | * | 8/2000 | Hagan et al. | 52/302.3 |

* cited by examiner

Primary Examiner—Carl D. Friedman
Assistant Examiner—N. Slack
(74) Attorney, Agent, or Firm—Ridout & Maybee

(57) ABSTRACT

A surface cladding system is disclosed in which corrugated plastic sheeting is utilized as wall cladding. In a preferred system, battens made of the same corrugated plastic sheeting are secured to the frame members of a wall. The battens are provided with a double side adhesive tape to which the corrugated plastic sheeting is attached. The joints between adjacent panels fall over frame members so that the edges of the adjacent sheets are sealed against water penetration by the double sided tape. The system can preferably be used in agricultural or industrial locations in which walls are frequently subjected to pressure spraying with water or other liquids. The wall system may also be used in recreational and domestic environments such as swimming pools or public washrooms, and also to line the cargo bays of cargo vehicles.

10 Claims, 5 Drawing Sheets

FIG. 5.
FIG. 6.
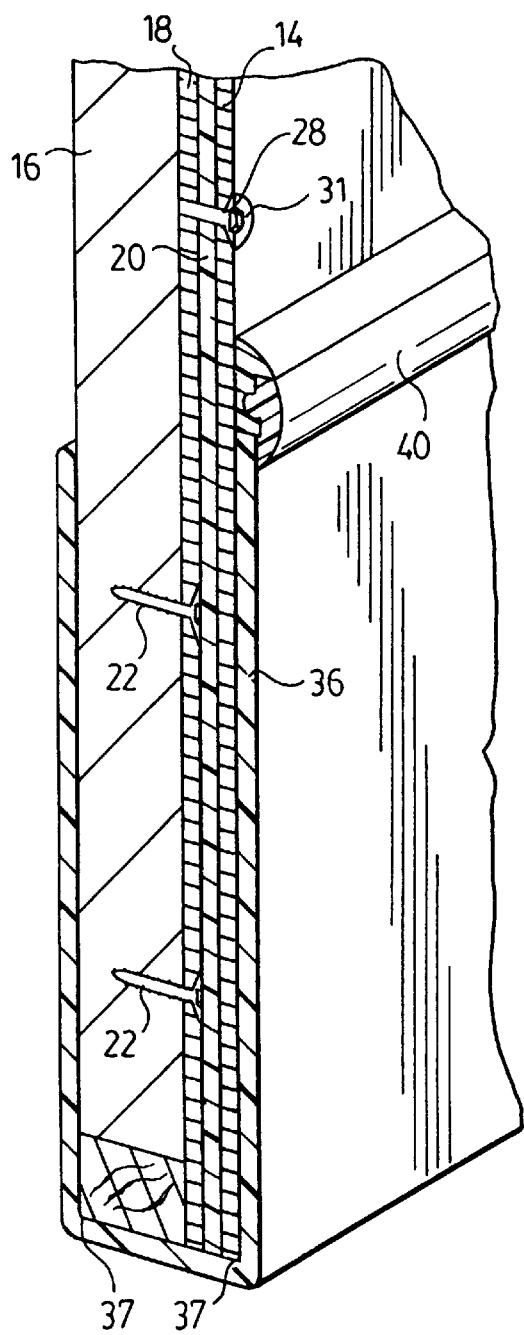
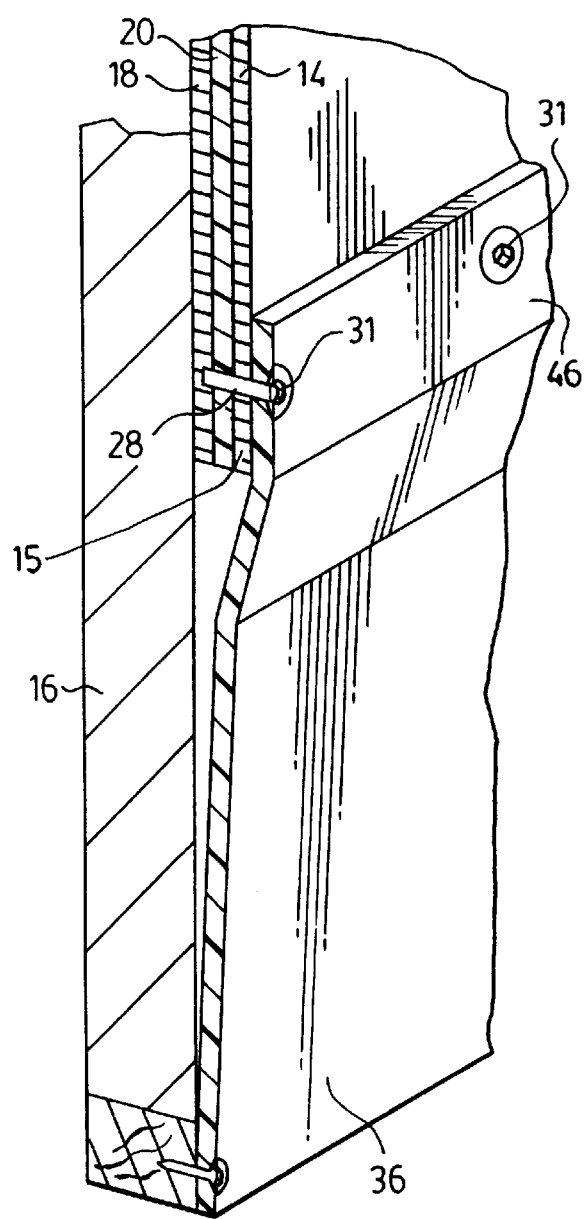

SURFACE CLADDING SYSTEM

FIELD OF THE INVENTION

This invention relates to a waterproof surface cladding system for example a system for cladding walls and ceilings. Especially the invention relates to hard wearing wall and ceiling cladding systems for use in agricultural or industrial locations in which the walls are frequently subjected to pressure spraying with water or other liquids. Additionally the wall system of the invention may be useful in recreational and domestic environments such as swimming pools, public washrooms, bathrooms, etc.

BACKGROUND OF THE INVENTION

There have been long standing problems in providing durable, waterproof, sterilized wall surfaces in many environments. In barns to house animals it is important to provide wall surfaces that may be washed down with strong disinfectants and which will stand up to destructive animals such as pigs. For swimming pools, campground washrooms and shower stalls and domestic bathrooms, car wash premises, etc., a main problem has been water vapour penetration of wall coverings to damage supporting wood frames. A secondary problem has been the difficulty in providing any partial solution to the first problem while presenting any type of reasonable aesthetic appearance.

Many efforts have been made to overcome these problems.

In animal barns, it is common place to provide a lower wall margin of concrete or metal cladding to guard against the destructive effects of the animals. Sometimes these lower parts of the walls are merely covered with painted plywood. Indeed, the upper parts may also be clad with plywood. Whatever the quality of the paint, such painted plywood is not wholly durable and detached paint chips may be a toxic hazard. Moreover, water penetration to the wood frame is frequent.

In public washrooms and domestic bathrooms ceramic tiles are frequently used to provide a waterproof surface but these are subject to grout mildew and breakage. Some public washrooms have painted brick walls, which, while not proof against vandalism, appear to be the best currently available. There is a very great need to provide an aesthetic, inexpensive cladding for public facilities, which, if not vandal proof, is at least easy to repair.

In commercial environments such as carwashes and other industrial premises, the walls may be clad with metal sheet or may simply be painted brick or concrete. None of these solutions are inexpensive or wholly satisfactory. Moreover, none of them provide any significant degree of heat insulation.

In commercial vehicles such as cargo vans or cargo airplanes, the insides of the cargo bays of such vehicles may be clad with plywood or specially formed plastic coverings. However, plywood is difficult to adapt to the irregularly shaped surfaces of the cargo bay, and specially formed plastic coverings are relatively expensive.

In some environments, specialty paints have been used for waterproofing but these always require a substrate such as drywall or plywood.

To replace wall board, plywood or rigid metal cladding, it would be desirable to provide a plastic coating over the whole wall surface of walls to be subjected to frequent pressure spraying or humidity. Difficulties concerning the durability of any such cladding and a watertight method of attachment have seemed insurmountable. Also, it has been conventional thinking that air access to the wood frame us important.

In fact, such air access to the wood frame is not very important if a truly waterproof surface to guard against ingress of water vapour or water spray is provided. In any event, air access to the frame may be provided from the exterior of the frame.

SUMMARY OF THE INVENTION

The inventor of the present invention has addressed the use of corrugated plastic sheet material as wall cladding in order to overcome the disadvantages of the prior art discussed above.

"Corrugated plastic sheet material" as used herein means composite plastic sheet material having a longitudinal dimension and a lateral dimension and a thickness dimension and comprises a pair of parallel surfaces spaced apart by plastic spacers which are continuous in the longitudinal direction. Thus, corrugated plastic sheet material may include a structure formed of plastics material which is strictly comparable to corrugated paperboard, i.e. two sheets of material separated by a intermediate corrugated sheet. Alternatively, it may include a structure comprising two sheets of plastics material separated by longitudinal spacer bars, for example Coroplast (trademark) manufactured by Coroplast Inc.

According to the invention there is provided a wall cladding system comprising battens formed of corrugated plastics sheet material for direct attachment to a wall or wall frame, wall cladding of corrugated plastics sheet material and double sided adhesive tape to attach said cladding to said battens at least at margins of said wall cladding.

The double sided adhesive tape should preferably be foamed plastics material having some resilience.

The battens may be attached to a wall or wall frame by any convenient attachment means such as nails, screws, staples or the like. The double sided adhesive tape may be applied over any such attachment means. This may provide an additional guard against any water ingress around the attachment means. The wall cladding is then applied over the double sided adhesive tape to seal the wall cladding to the tape at least at its margins. Where the edges of the two sheet of cladding abut one another, they are applied over a single piece of tape to form a water tight seal.

It is possible to use secondary attachment means for the wall cladding. For example, pegs may be driven into the batten through the wall cladding and the double sided adhesive tape. The wall cladding may be provided with predrilled holes for this purpose. While the tape and battens could be predrilled also, this is not necessary. It may, however, be convenient to mark them with indicia for convenient peg spacings. Such pegs may add reassurance to the user that the system is securely fixed. However, since very reliable double sided adhesive foam tape is available, such secondary attachment means may not be wholly necessary.

For the purpose of providing water proofing at corners of a building, it is desirable that a continuous plastic surface should extend through the corner to guard against water penetration at such a water retaining location. For this reason it is preferred that two sheets of corrugated plastics sheet material not be abutted at such corners. Better waterproofing may be obtained by coining a bend line in a single sheet of corrugated plastics sheet material so that it may be bent about the corner. Alternatively the margin of one sheet may be provided with a coin line so that it may be bent at the corner. The margin may then be overlapped over an adjacent sheet at the corner.

It is possible that the coining will cause a break in one of the parallel surfaces of the composite sheet material but the other surface should remain in tact to allow proper waterproofing at the corner. Indeed, it may be desirable to slit one surface of the corrugated plastic sheet material at the outer edge of the corner so that a clean bend may be achieved. It is immaterial whether the corner be an outside corner or an inside corner.

Where the system is to be used in a particularly aggressive location, such as in barns where animals can be exceedingly destructive and may damage the lower part of the wall, the wall cladding of corrugated plastics sheet material may be used on the upper part of the wall where animal damage is less prevalent. The lower part of the wall may be clad with high density polyethylene sheet which may be applied in place of, or over the top of, the corrugated plastics sheet material. If the installation is a new installation, the high density polyethylene sheet may be applied to a wooden wall frame before the frame is set on its foundation. In this case, the high density polyethylene sheet may be wrapped around the bottom of the frame for additional insurance against water penetration.

Where a horizontal join occurs between high density polyethylene sheet on the lower wall surface and the corrugated plastics sheet material of the wall cladding of the upper surface, a seal may be provided between them. The seal may comprise an inner strip applied in water tight manner to the corrugated plastics sheet material and an outer strip applied to the high density polyethylene sheet. The strips may mate together in water tight manner by means of snap together fastening. One of the strips may include a longitudinal groove along its length and the other of the strips may include a longitudinal rib along its length, the rib being manually engagable into the groove in male/female water tight engagement.

BRIEF DESCRIPTION OF THE DRAWINGS

Embodiments of the invention will now be described by way of example with reference to the accompanying drawings in which:

FIG. 5 is a cross section through a wall having reinforced wall cladding according to the invention over a lower part of the wall;

FIG. 6 is a section through a wall having an alternative reinforced wall cladding according to the invention over a lower part of the wall;

DETAILED DESCRIPTION OF PREFERRED EMBODIMENTS

Figure 1:
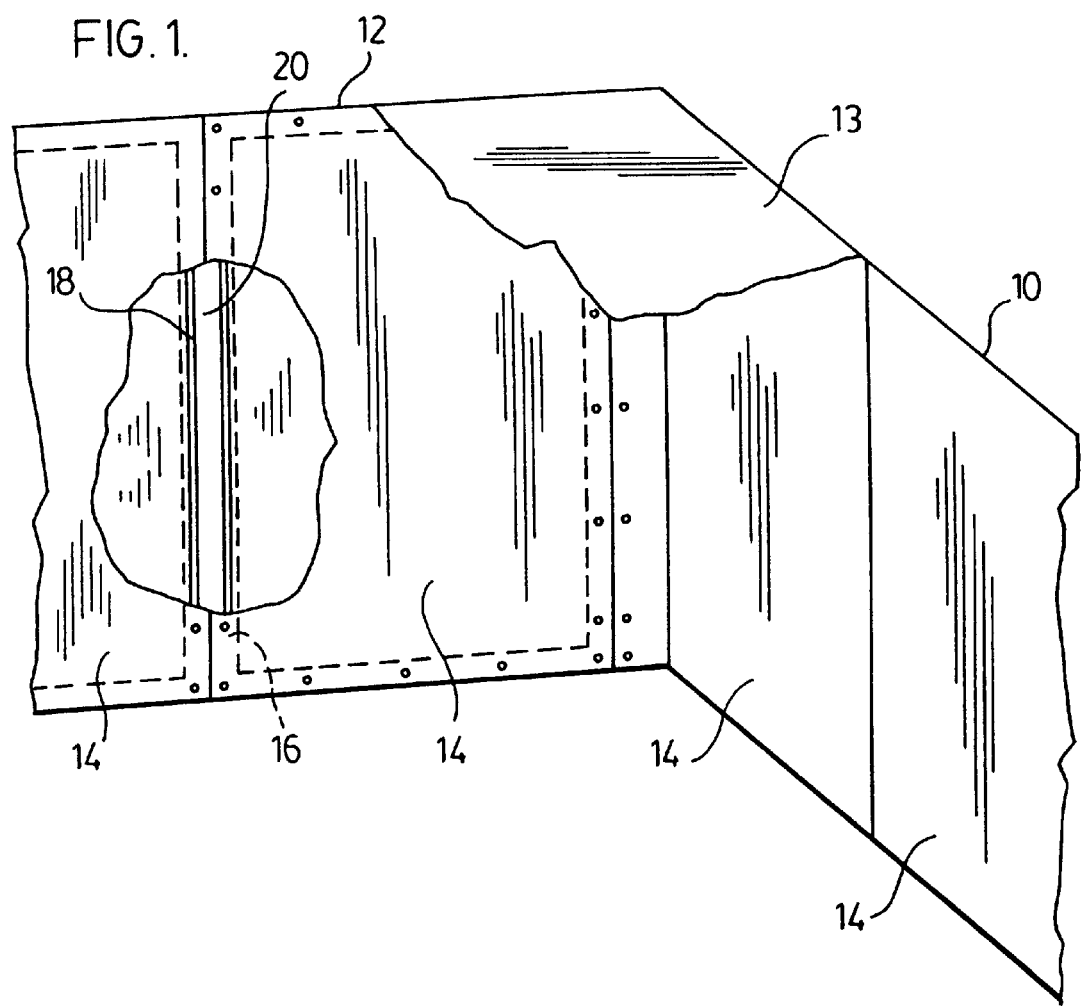
FIG. 1 illustrates a wall cladding system according to the invention.
Figure 2:
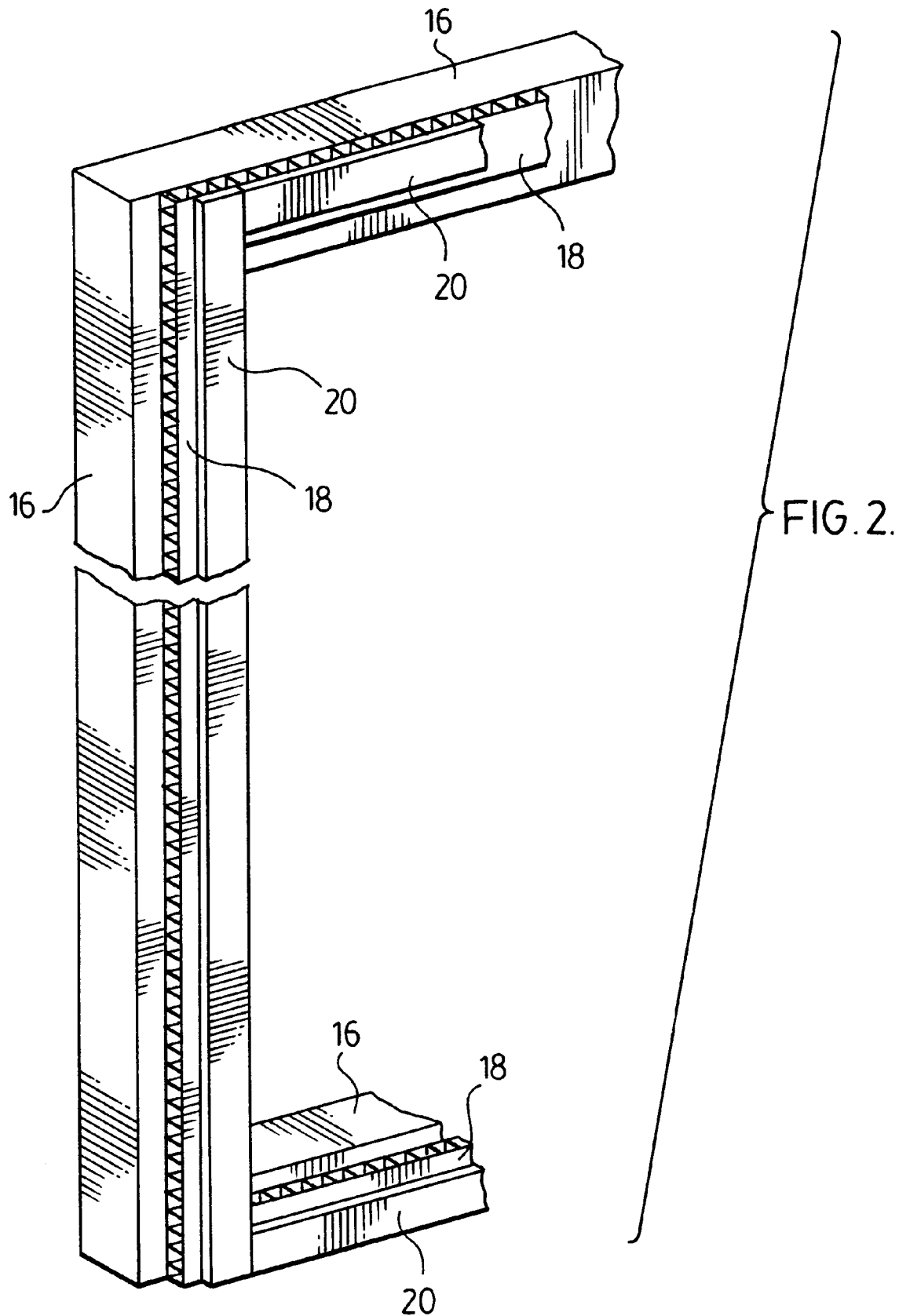
FIG. 2 shows the use of the system of FIG. 1 in relation to a wooden frame wall.

FIG. 1 of the drawings shows an interior corner of the interior of a space of which the walls are clad with a wall system according to the invention. Walls 10, 12 and ceiling 13 are clad with sheets of corrugated plastics sheet material 14, which may, for example, be Coroplast. Battens 18 of the same corrugated plastics sheet material are applied to the wall frame 16 using screws, nails or other attachment means. Double sided adhesive tape is applied over the heads of the screws 22. Wall cladding sheets 14 are applied over the adhesive tape 20 at least at their margins. Where adjacent wall cladding sheets 14 have abutting adjacent edges, each of these edges is aligned with the centre longitudinal line of the adhesive tape 20.

Where the wall frame 16 is a standard stud wall frame having vertical studs at intervals, e.g. 16 inches, battens 18 of corrugated plastics sheet material may be applied to each stud and double sided adhesive tape may be applied to each batten. Battens 18 and adhesive tape 20 may also be applied to the top and bottom of the wall frame asymmetrically on frame 16 to attach sheets 14 as close as possible to the floor or ceiling. This arrangement may better be seen from FIG. 2.

The double sided adhesive tape 20 may suitably be double sided adhesive foam tape to provide some resilience and additional sealing between wall cladding 14 and batten 18. The tape should have sufficient width to allow both vertical margins of adjacent cladding sheets 14 to seal against the tape. The tape may, for example, be double coated rubber polyethylene foam tape of the EO type cross linked. It may be closed cell black and white polyethylene foam coated with 2 mils of a solvent free rubber resin emulsion on each side with a 60# Densified Kraft liner. The adhesive is formulated to provide an aggressive water based, high shear product. The thickness of the tape is not of importance but may suitably be $\frac{1}{32}$ inches.

The double sided adhesive tape may usually provide sufficient attachment for the cladding sheets 14. However for additional security plastic material pegs 28 may be used between battens 18 and cladding sheets 14. The battens 18, tape 20 and sheets 14 may be predrilled to accept shank 29 of peg 28 tightly in the drilled holes. Pegs 28 should have heads 31 of appreciable diameter to guard against water ingress.

At an internal corner 24 one of the wall cladding sheets 14 bends around the corner at coin line 26. Coin line 26 is applied vertically on that surface of wall cladding sheet 14 which is to form the outer angle.

Figure 3:
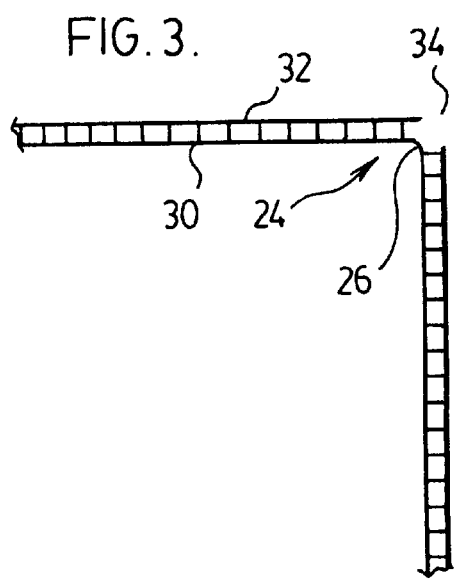
FIG. 3 shows the behaviour of corrugated plastics material sheet at a corner.

The behaviour of the corrugated plastics sheet material, when bent about a coin line is demonstrated in FIG. 3 which show the plastic sheet having two parallel surfaces 30, 32 bent about coin line 26 so that surface 30 presents an unbroken water tight surface while surface 32 is illustrated as having a break 34. It is to be noted that break 34 may not occur but only stretching of surface 32. Nevertheless, even when a break 34 occurs, a continuous surface is presented at the corner against the ingress of water vapour.

Figure 4:
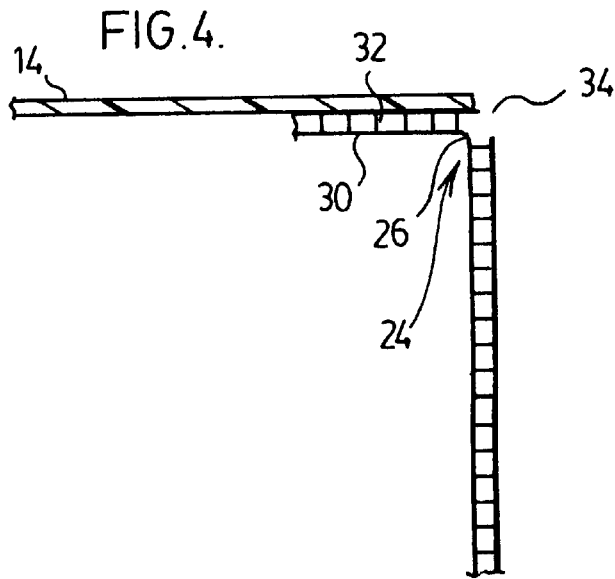
FIG. 4 shows an alternative arrangement at a corner.

It may, in fact, be advantageous to actually slit surface 32 when forming the coined line 26. If such a slit is made, it may be easier to bend cladding sheet 14 about coin line 26 without buckling or irregularity.

Where it is not desired to provide a coined line 26 to bend a large sheet 14 of cladding around a corner, abutting sheets may be used at corners but it is desirable to bend a margin of one of the sheets so that it overlies the adjacent sheet as shown in FIG. 4. Such a join may be sealed with silicone sealant FIG. 5 shows a cross section of a wall system according to the invention intended for heavy duty use such as in animal barns. The system of FIG. 4 shows wall cladding sheet 14 exposed over an upper portion of the wall, 10, 12 and reinforcing, high density polyethylene sheet 36 covering the lower portion of the wall and the lower surface of the wall cladding sheets 14. In fact, to save expense, it may not be necessary to extend wall cladding sheets downwardly to the floor. They may, instead, end just below the top edge of high density sheet 36 as shown in FIG. 5.

The high density polyethylene sheet 36 is shown as wrapping around the bottom of wood frame 16 to protect it against any possible ingress of water at the bottom edge. Wood frame 16 may then be located in a groove of a concrete or other foundation with minimum fear of rotting due to water penetration. Of course, for existing structures, high density polyethylene sheet 36 may have a lower edge abutting the foundation 38 and a suitable seal may be applied. Coin lines 37 may be provided to facilitate wrapping of high density polyethylene sheet 36 about the bottom of wood frame 16.

Where high density polyethylene sheet 36 adjoins cladding sheet 14, a seal 40, for example a rubber gasket, may be applied between them (see FIG. 5). The seal 40 is conveniently a two part seal having an elongate female member applied to wall cladding sheet 14 and an elongate male member applied to high density polyethylene sheet 36 to snap into female member 42 along its length. Of course, as an alternative, the male member may be applied to the wall cladding sheet and the female member may be applied to the high density polyethylene sheet 36.

In some situations it may not be necessary to go to the extra expense of providing a two part rubber gasket. As shown in FIG. 6, for less expensive installations, it maybe possible to seal between a margin 46 of the high density polyethylene sheet and the cladding sheet 14 with silicone sealant. The upper margin 46 of the high density polyethylene sheet 36 may be tightened against a lower margin 15 of the cladding sheet 14 by means of pegs 28 which fasten the upper margin 46 of the high density sheet 36 and the lower margin 15 of the cladding sheet 14 at least into one of the battens 18

Figure 7:
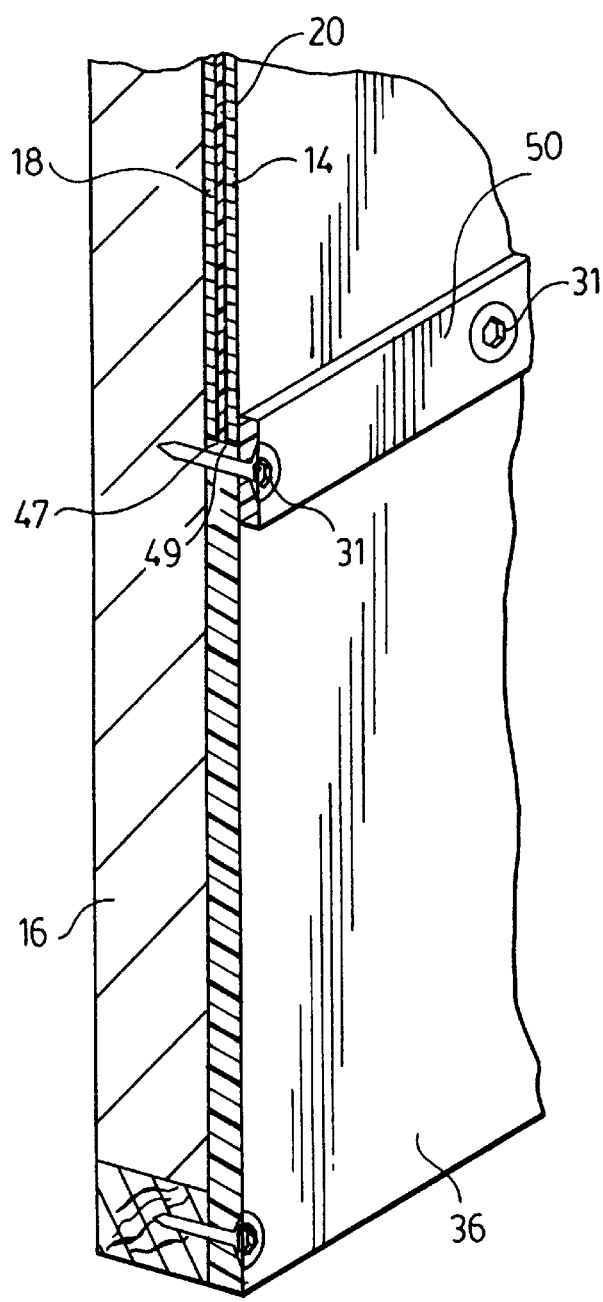
FIG. 7 is a modification of the arrangement of FIG. 6.

FIG. 7 shows an alternative arrangement to that of FIG. 6. An edge 47 of the high density polyethylene sheet is abutted to an edge 49 of the cladding sheet 14 and a sealing strip 50 is applied over the join. Sealing strip 50 may be a profile or a simple strip of plastic sheet. Screws may be used to fit it in position and silcone seal may be used on its inner surface.

The thickness of the corrugated plastics sheet material used for cladding panels 14 may be of any convenient gauge depending on the application and the durability and heat insulation required. Corrugated plastics sheet material has an appreciable heat insulation capacity due to the air pockets trapped within it. The R value of such insulation is dependent upon the thickness of the material. The use of material of any particular thickness is entirely dependent upon choice. It is suggested that for very general purposes a thickness of 6 mil for wall surfaces and a thickness of 4 mil for ceilings surfaces may be suitable.

Figure 8:
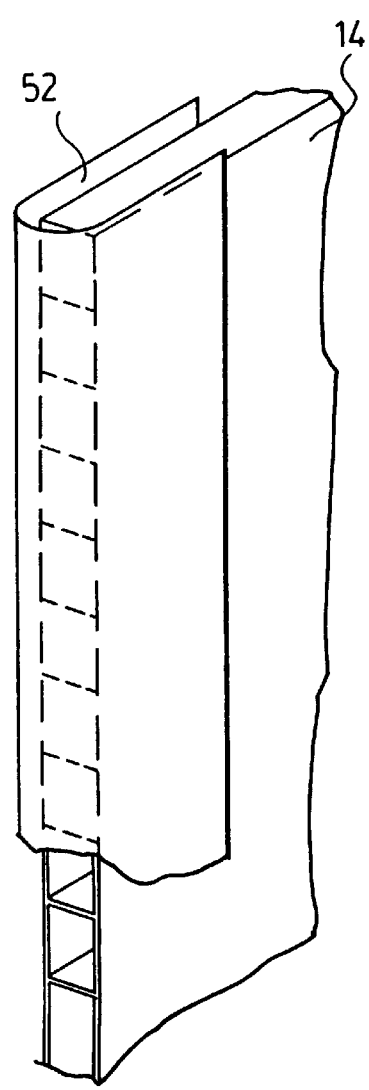
FIG. 8 shows means of sealing a raw edge of corrugated plastics material.

Any raw edges of the corrugated plastics cladding sheet may be closed with a U-channel 52 as is shown in FIG. 8. This is particularly important when there is a danger of bacteria and dirt penetrating corrugations. The U-channel 52 may be sealed with silicone sealant.

The battens 18 are shown in the drawings as being continuous such that they extend over substantially the lengths of the frame members to which cladding sheets 14 are applied. However, it will be appreciated that this is not necessarily the case. Specifically, the battens 18 need not be continuous where they are applied to frame members falling between joints between sheets 14, since these battens 18 do not perform a sealing function. The battens 18 between joints may therefore be discontinuous and may preferably take the form of square or rectangular pieces of cladding having two sided adhesive tape applied to one side. These discontinuous battens 18 are applied in spaced relation to the frame members by fasteners as discussed above. Unless otherwise stated, the term "batten" as used herein is intended to include both continuous and discontinuous battens.

Since discontinuous battens 18 do not perform a sealing function, they are preferably not applied to frame members which underly joints between adjacent sheets 14. Where joints are formed between adjacent sheets 14, it is preferred that the batten 18 be continuous as shown in FIG. 1.

Figure 9:
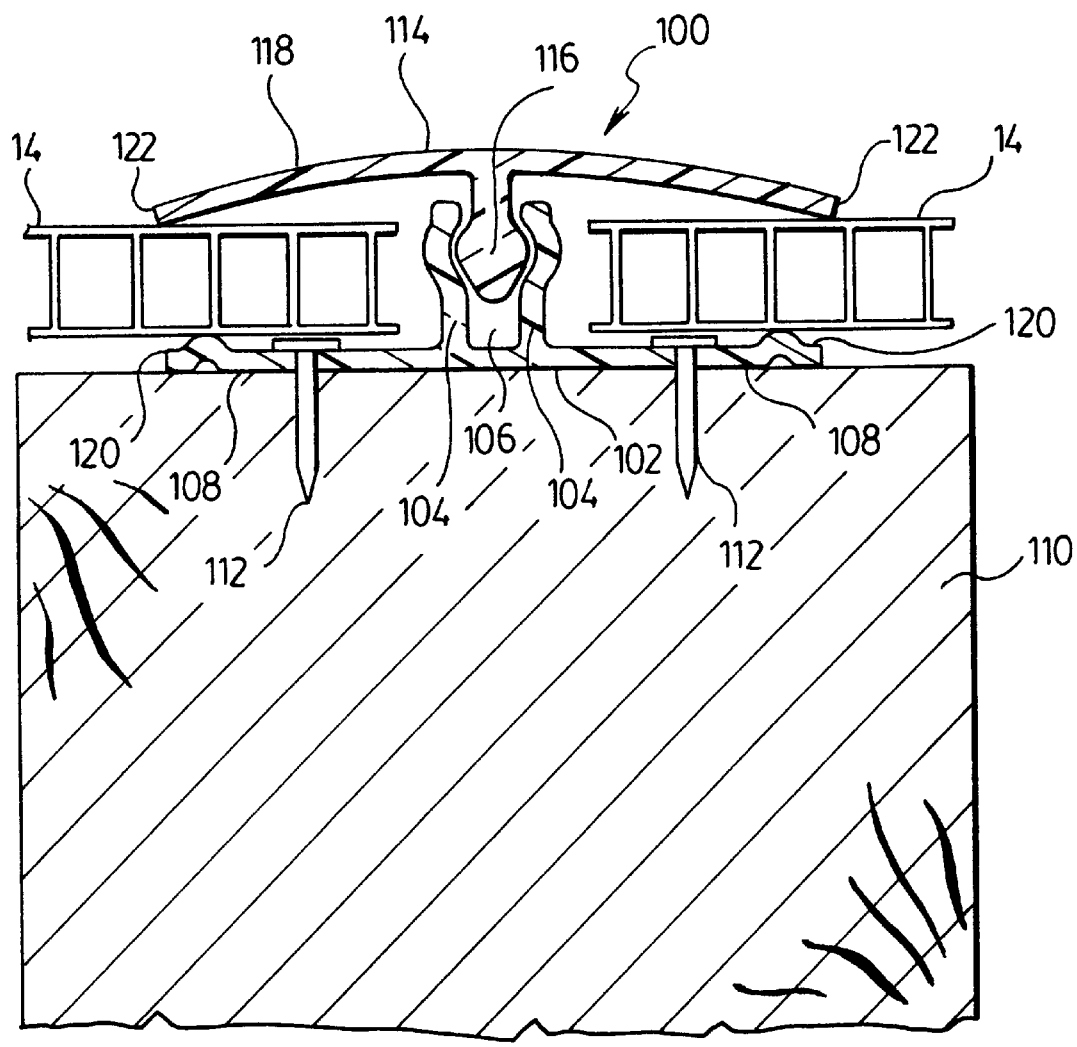
FIG. 9 is a cross-sectional view showing an alternate means for providing a sealed joint between adjacent panels of corrugated plastic material.

FIG. 9 illustrates a cross-sectional view of an alternate batten 100 which may preferably be used to provide a sealed joint between two adjacent sheets 14. Batten 100 is elongate and preferably extends along the length of the joint between sheets 14 in order to prevent water penetration behind the cladding. Batten 100 comprises a female section 102 having two upstanding walls 104 forming a trough 106 and nailing flanges 108 by which it can be attached to the face of a frame member. In FIG. 9, the female section 102 is secured to the face of a wooden stud 110 by nails 112 driven through flange 108. The batten 100 also comprises a male section 114 comprising a centrally extending ridge 116 which is adapted to form a secure friction fit inside trough 106 and a sealing member 118 which is preferably rounded. The rounding of sealing member 118, coupled with raised edges 120 of nailing flange 108, results in the edges of sheets 14 being firmly held by batten 100, with a seal being formed by contact of edges 122 of sealing member 118 with the face of sheets 14.

In use, the female section 102 of batten 100 is nailed to the face of a stud member 110 as described above. The panels 14 are then lined up so that their edges overlap nailing flanges 108 as shown in FIG. 9. The ridge 116 of male section 114 is then pressed into trough 106 throughout the length of batten 100 and the ends of the batten are sealed, if desired, by silicone sealant.

It is expected that the wall cladding system of the invention will be useful in a very large number of diverse environments for example those already discussed. In commercial environments such as car wash premises and some industrial locations, the smooth surface of the corrugated plastic sheet material may provide improved water proofing and improved aesthetic appearance. It may be used on the outside of a building to direct drainage water into the weeping tile to mitigate the danger of water penetration into the basement. Moreover, because the smooth surface is somewhat slippery it may be easier to wash down than conventional cladding materials. Somewhat similar considerations apply for public facilities such as public washrooms, swimming pools, subway stations, etc. For agricultural environments the system may provide at least as high a degree of resistance to destruction as conventional wall surfaces. Moreover, it is easy to sterilize and may provide some heat insulation. For domestic environments it is anticipated that it may be particularly useful for garages, outside storage areas and unfinished basements. When used in garages it may allow the householder the facility to wash the car indoors.

In addition, the surface cladding system according to the invention can be used to cover the insides of cargo bays of commercial vehicles such as cargo vans and airplanes. In such applications, the inside surfaces of such vehicles are typically provided with metal frame members to which the corrugated plastic material sheet can be applied. Since the dimensions of a particular model of vehicle are standardized, a more economical way to cover the inside of the vehicle may be to provide pre-cut panels with two sided adhesive tape applied to the back thereof, the location of the tape corresponding to the locations of the support members in the cargo bay. The panel would then simply be pressed against the walls and/or ceiling of the cargo bay such that the adhesive tape contacts the support members.

What is claimed is:

1. A surface cladding system applied over a wall having a plurality of frame members, comprising:
   a plurality of battens, each of which is secured to a surface of one of the frame members of the wall, each of the battens having panel securing means;
   a plurality of panels covering the wall and secured thereto by the panel securing means of the battens, wherein joints are formed between edges of adjacent panels, each joint being formed over a frame member such that the edges of the panels along the joint are secured by the panel securing means of one of the battens, wherein the edges are substantially sealed against water penetration by the panel securing means;
   wherein the battens and the panels are comprised of a corrugated plastic sheet material, and wherein the panel securing means comprises an adhesive layer which is applied to a surface of the batten to which the panel is secured.

2. The surface cladding system of claim 1, wherein the battens extending along the joints between adjacent panels are continuous.

3. The surface cladding system of claim 2, wherein the battens between the joints comprise a first section which is secured along the frame member and has elongate connection means extending along the joint between the edges of the adjacent panels; and a second section which is applied over the edges of the panels and has connection means which are adapted to be secured to the connection means of the first section.

4. The surface cladding system of claim 3, wherein the first section comprises a female section with the connection means comprising a trough, and the second section comprises a male section in which the connection means comprises a ridge member which is received in the trough with a friction fit.

5. The surface cladding system of claim 1, wherein the adhesive layer comprises a two sided adhesive tape.

6. The surface cladding system of claim 1, wherein the battens which completely underly a single one of the panels are discontinuous.

7. The surface cladding system of claim 1, wherein the battens have a width substantially the same as a width of the surface of the frame members to which they are secured.

8. The surface cladding system of claim 1, additionally comprising a sheet of high density plastic material which is applied to a lower portion of the wall.

9. The surface cladding system of claim 8, wherein the high density plastic material is applied over the plurality of panels.

10. The surface cladding system of claim 8, wherein the high density plastic material is applied the wall.

* * * * *